US012488665B2

(12) United States Patent
Panico et al.

(10) Patent No.: US 12,488,665 B2
(45) Date of Patent: Dec. 2, 2025

(54) TETHERING SYSTEM FOR PORTABLE ARTICLE

(71) Applicant: SE-KURE CONTROLS, INC., Franklin Park, IL (US)

(72) Inventors: Patrick C. Panico, Berwyn, IL (US); David M. Adams, Stone Park, IL (US); Michael E. Pawelek, Elmhurst, IL (US); John W. Manser, Elgin, IL (US)

(73) Assignee: Se-Kure Controls, Inc., Franklin Park, IL (US)

(*) Notice: Subject to any disclaimer, the term of this patent is extended or adjusted under 35 U.S.C. 154(b) by 84 days.

(21) Appl. No.: 18/653,075

(22) Filed: May 2, 2024

(65) Prior Publication Data

US 2025/0157310 A1 May 15, 2025

Related U.S. Application Data

(60) Provisional application No. 63/598,414, filed on Nov. 13, 2023.

(51) Int. Cl.
*G08B 13/14* (2006.01)
*E05B 73/00* (2006.01)

(52) U.S. Cl.
CPC ..... *G08B 13/1463* (2013.01); *G08B 13/1445* (2013.01); *G08B 13/1454* (2013.01); *E05B 73/0005* (2013.01)

(58) Field of Classification Search
CPC ............ G08B 13/1463; G08B 13/1454; G08B 13/1445; E05B 73/0005
See application file for complete search history.

(56) References Cited

U.S. PATENT DOCUMENTS

| | | | | |
|---|---|---|---|---|
| 6,993,942 B2 * | 2/2006 | Boni | A63C 11/02 | 70/57 |
| 7,187,283 B2 * | 3/2007 | Leyden | G08B 13/1463 | 340/568.1 |
| 7,204,107 B2 * | 4/2007 | Leyden | G08B 13/06 | 70/58 |
| 8,683,959 B2 * | 4/2014 | Friedland | E05B 37/025 | 119/793 |
| 10,398,045 B2 * | 8/2019 | Avganim | E05B 73/0005 | |
| 11,640,754 B2 * | 5/2023 | Napthine | G08B 13/2434 | 340/572.8 |

* cited by examiner

*Primary Examiner* — John A Tweel, Jr.
(74) *Attorney, Agent, or Firm* — Wood, Phillips, Katz, Clark, & Mortimer

(57) ABSTRACT

The combination of: a portable article; and a tethering system having an elongate flexible component, a main body having a first slot, and a housing. A part of the elongate component is fixed to the main body. A length of the elongate component extending away from the fixed part can be formed into a "U" shape with spaced legs, with one of the legs directed into the first slot over a first length of the main body and to beyond the main body for connection to a support. With the housing and main body in an assembled relationship, the housing blocks the one of the spaced legs of the "U" in the first slot on the main body over the first length whereby friction forces generated between the elongate component and at least one of the main body and housing resist sliding of the elongate flexible component along the first slot as would change a size of the "U" shape.

23 Claims, 11 Drawing Sheets

*Fig. 1*
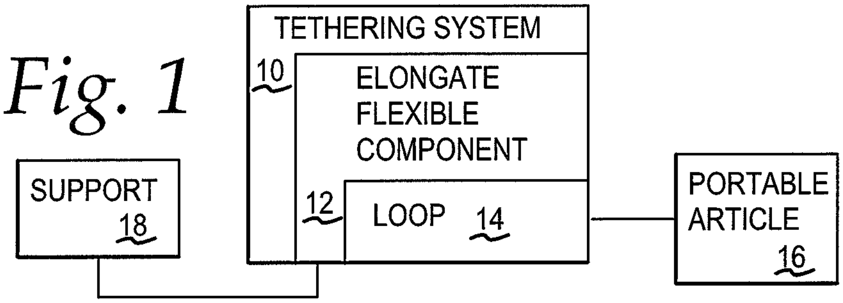
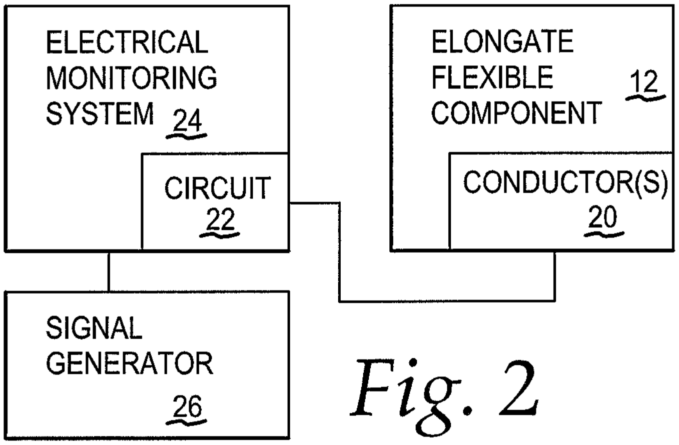
*Fig. 2*
*Fig. 3*
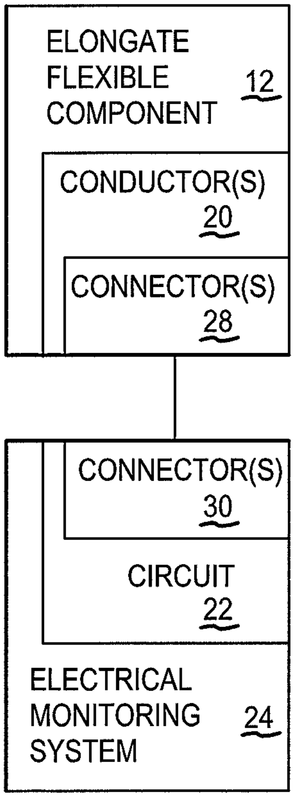
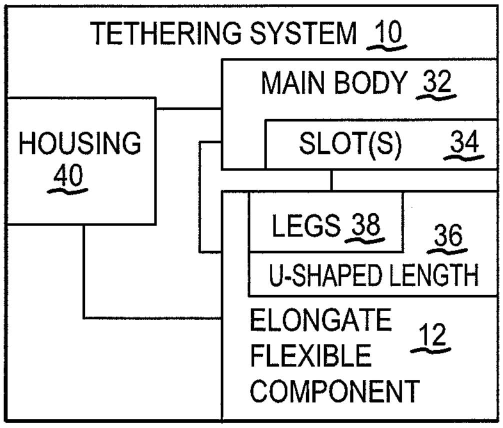
*Fig. 4*

Fig. 11
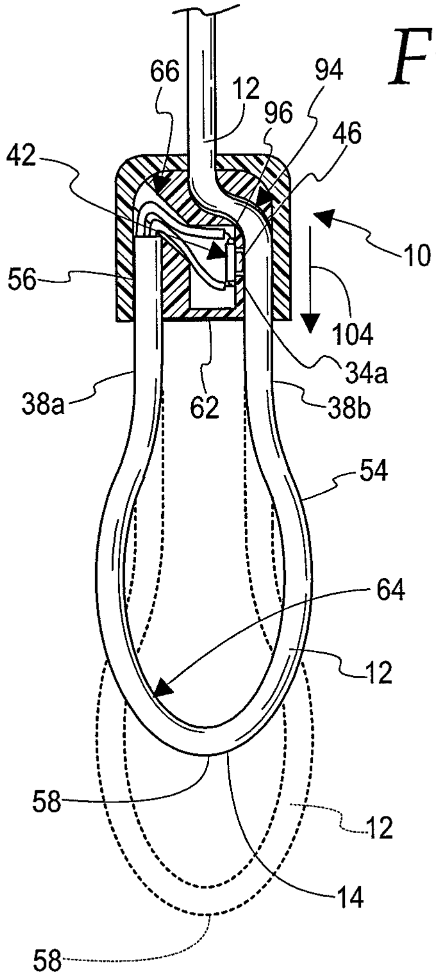
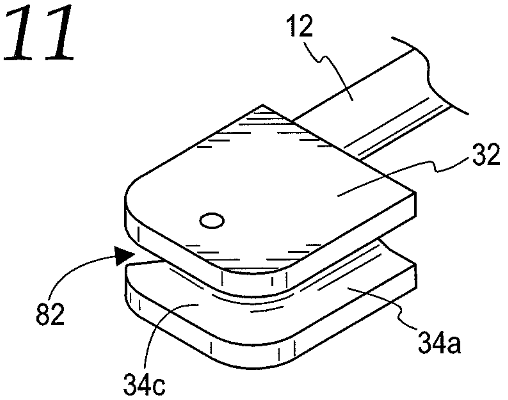
Fig. 12
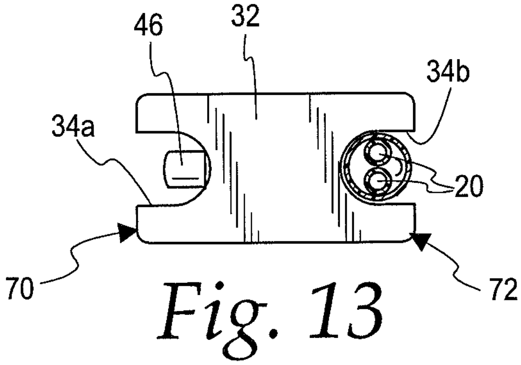
Fig. 13
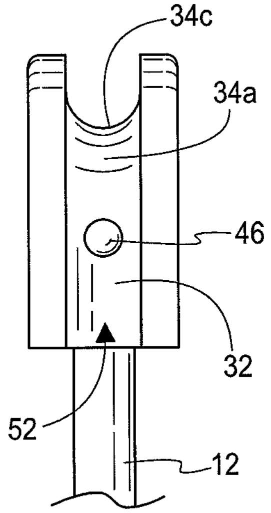
Fig. 14
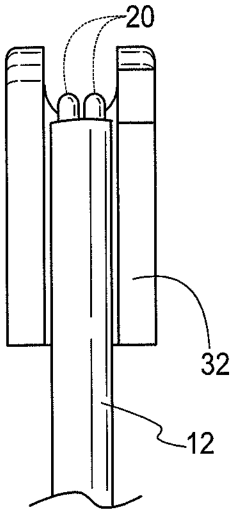
Fig. 15
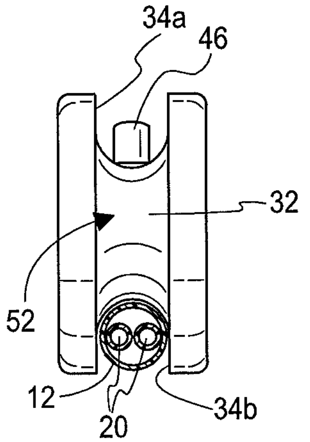
Fig. 16

*Fig. 17*
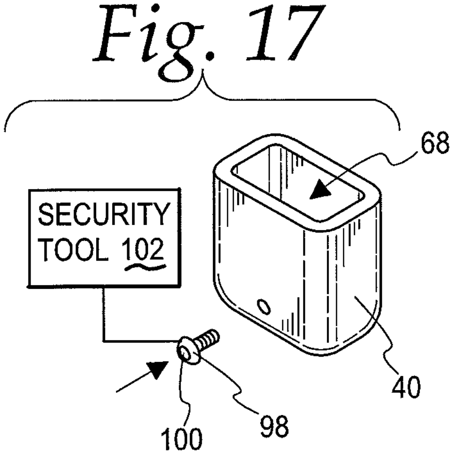
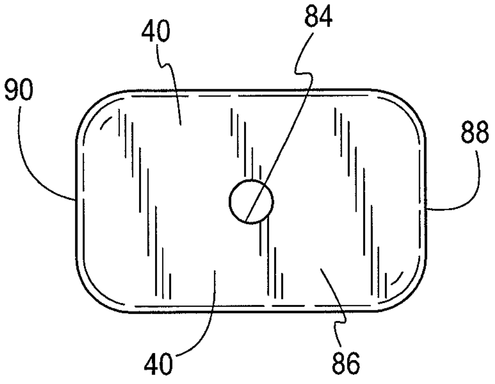
*Fig. 18*
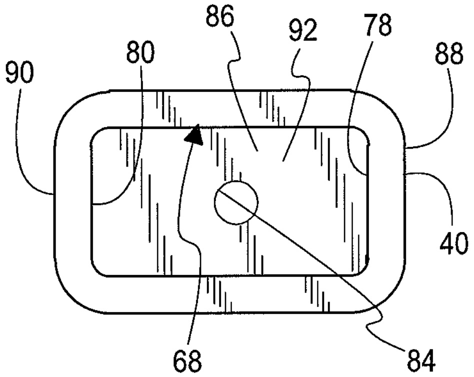
*Fig. 19*
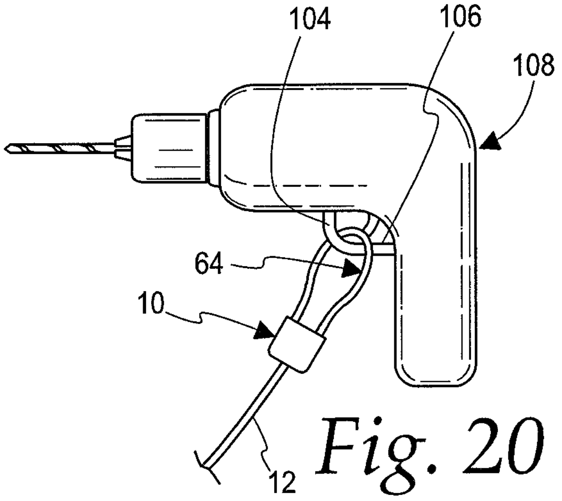
*Fig. 20*
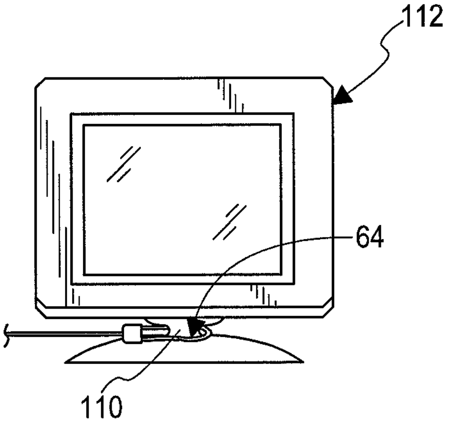
*Fig. 21*
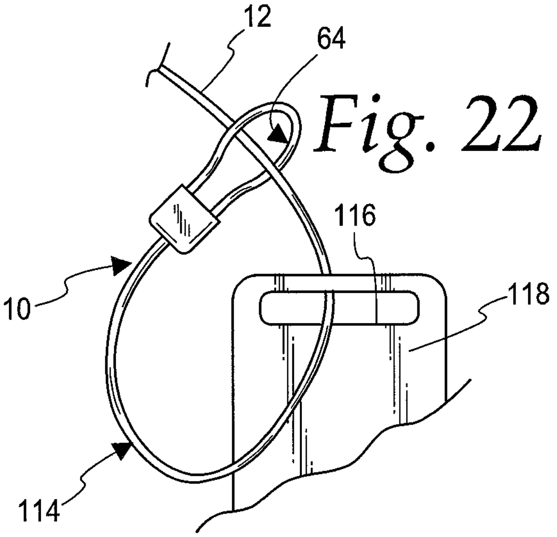
*Fig. 22*

TETHERING SYSTEM FOR PORTABLE ARTICLE

CROSS-REFERENCE TO RELATED APPLICATIONS

This is a non-provisional application claiming priority to U.S. Provisional Application No. 63/598,414, filed Nov. 13, 2023, which is incorporated herein by reference.

BACKGROUND OF THE INVENTION

Field of the Invention

This invention relates to portable articles and, more particularly, to a tethering system for controlling movement of a portable article to within a selected range.

Background Art

Portable consumer articles, such as electronic devices, are commonly displayed in retail establishments so as to permit potential purchasers to observe, handle, and operate, the devices. By making devices available to potential consumers in this manner, the shopping experience is enhanced, which generally leads to larger sales volume.

At the same time, the accessibility of devices for handling increases theft. This has led to the development of many different security systems, which range from simple mechanical to more sophisticated electronic.

One common technique for confining movement of articles from a prescribed area is to utilize a tethering system. One sub-category uses an elongate flexible component that has an associated closed loop. Commonly, the closed loop is defined by bending the flexible component into a "U" shape and connecting the legs of the "U" so as to maintain a closed loop configuration.

Generally, this type of tethering system can be used by: a) closely wrapping the loop around the perimeter of an article; b) forming the loop through a fully surrounded opening around a part of an article; c) directing part of the flexible component through the loop to define an adjustable sub-loop; or d) surrounding a necked region of an article with the loop.

In the case of c), a free end of the elongate component is directed through a fully surrounded opening on an article and in turn the loop on the elongate component, whereupon a variable diameter sub-loop surrounds a part of the article, with the free end available to be anchored relative to a support.

In the case of a) and d), the loop is generally designed to have a variable effective diameter.

These types of tethering systems may be purely mechanical, or alternatively the elongate flexible component may have one or more conductors used to define part of an electrical path. The electrical path may be integrated into a circuit that monitors the state of the tethering system and generates a detectable signal in the event of a breach, as by severance of the elongate flexible component or separation of the same from an article being monitored.

Many different systems have been devised to form fixed and variable diameter loops from/on an elongate flexible component. These systems range from a permanent mechanical crimping component to more complex systems that can be reconfigured.

Generally, an objective of designers of security systems is to make the overall systems, including the tethering systems, versatile, simple to use, and affordable to manufacture.

U.S. Pat. No. 3,770,307, to Van Gompel and U.S. Pat. No. 6,540,273, to Brammall et al., show exemplary systems that incorporate a relatively complex mechanism to maintain a closed loop shape with an elongate flexible component. The number of cooperating parts required in each increases manufacturing cost and complexity and may lead to operational failure.

If the systems are not simple to use, they may be left disabled or personnel in charge of setting the systems up may effect an improper setup whereupon the security system is ineffective. This may lead to losses that might otherwise be prevented by a properly installed security system.

If systems become too expensive, business owners may in some instances assume greater risk and invest the monies, earmarked for such security systems, into other parts of the business, which may not be focused adequately on effective individual article security.

Another problem with certain conventional tethering systems is that they require a pinching force to be exerted on a part of an elongate flexible component to maintain a loop shape. This potentially creates a problem, particularly with elongate components that incorporate conductors that are integrated into a circuit. At initial setup/installation, the pinching pressure on the elongate component may be such that the conductive portion thereof is undesirably exposed or compromised. This may preclude a proper setup or may lead to a false alarm condition.

Ideally, tethering systems of this type that rely upon an adjustable loop also allow reuse of the tethering system on different articles that may have the same or different configurations. For this to be practical, an end user has to be able to disassemble part of this tethering system to adjust the effective loop diameter. Some prior art systems make this impractical or impossible by reason of their complexity or by reason of alteration of part of the tethering system as each loop configuration is formed.

Tethering systems of this type may also be difficult to practically design by reason of the need to put in a switch with an actuator that is repositioned to establish a conductive path with the desired loop formed. This often leads to complicated designs which may result in improper setup, attributable potentially to human error and/or part failure.

Given the high cost of small electronic consumer articles, it is key to be able to effectively secure these articles against theft while allowing them to be handled and operated conveniently as consumers weigh purchase options. Thus, the tethering systems must be made to be reliable and capable of being set up conveniently by persons without mechanical or electrical sophistication. As noted above, the systems must also be affordable to encourage their use, thereby avoiding a decision by a business owner to use a lower price, and potentially less effective, system or altogether eliminate security systems on some articles that are commonly the targets of thieves.

The industry continues to develop security systems, including tethering systems and parts therefor, to address some or all of the above problems.

SUMMARY OF THE INVENTION

In one form, the invention is directed to the combination of a portable article and a tethering system for the portable article. The tethering system includes: an elongate flexible component; a main body having a first slot; and a housing.

A part of the elongate flexible component is fixed to the main body. The elongate body is configured so that a length of the elongate flexible component extending away from the fixed part of the elongate flexible component can be formed into a "U" shape with spaced legs, with one of the spaced legs of the "U" shape directed into the first slot over a first length of the main body and to beyond the main body for connection to a support. The housing and main body are configured so that the housing and main body can be placed in an assembled relationship wherein the housing blocks the one of the spaced legs of the "U" shape in the first slot on the main body over the first length. Friction forces generated between the elongate flexible component and at least one of the main body and housing resist sliding of the elongate flexible component along the first slot as would change a size of the "U" shape. With the main body and housing in the assembled relationship, the "U" shape and at least one of the main body and housing cooperatively define a closed loop with an effective diameter. The tethering system can be used to engage the portable article by either: a) extending the closed loop around at least a part of the portable article; or b) extending a length of the elongate flexible component through the closed loop to produce a secondary loop that can be extended around at least part of the portable article.

In one form, the elongate flexible elongate element, main body, and housing are configured so that by selecting a length region of the one of the spaced legs that is directed into the first slot on the main body, a desired effective diameter for the closed loop can be selected over a range of diameters.

In one form, the housing defines a cup-shaped receptacle. With the housing and main body in assembled relationship, at least a portion of the housing is advanced into the receptacle. The housing blocks the elongate flexible component in the first slot over at least a part of the first length.

In one form, the housing has a surrounded opening through which the elongate flexible component extends so that the housing can be slid guidingly along the elongate flexible component from a pre-assembly position wherein the housing is spaced from the main body and an assembled position wherein the housing and main body are in the assembled relationship.

In one form, the main body has a periphery at which the first slot is formed. The main body has a second slot spaced peripherally on the main body from the first slot. The other of the legs of the "U" shape is directed into the second slot over a second length of the main body.

In one form, the first and second slots open in opposite directions away from each other.

In one form, the tethering system further includes at least one fixing component that maintains the housing and main body in the assembled relationship.

In one form, the elongate flexible component has at least one conductor that defines a conductive path through the elongate flexible component that can be used to integrate the conductive path defined by the at least one conductor into an electrical circuit in an electrical monitoring system capable of generating a detectable signal in the event that the conductive path is interrupted.

In one form, the tethering system has a switch on the main body changeable between: a) a first state wherein the conductive path is interrupted; and b) a second state wherein the conductive path is formed. The switch has an actuator that is changed from a first position into a second position. The switch is in the first state with the switch in the first position, and is changed into the second state as an incident of the switch being changed from the first position into the second position.

In one form, at least a part of the actuator resides in the first slot and is configured to be changed from the first position into the second position as an incident of the one of the legs of the "U" shape being directed into the first slot.

In one form, the actuator is normally biased into the first position.

In one form, the main body has a periphery at which the first slot is formed. The first slot has a length extending in a first path. The main body has a transverse slot having a length extending in a second path transverse to the first path. With the housing and main body in the assembled relationship, the housing blocks a length of the elongate flexible component extending away from the fixed part of the elongate flexible component into the transverse slot.

In one form, the housing has a surrounded opening through which the elongate flexible component extends so that the housing can be slid guidingly along the elongate flexible component from a pre-assembly position where the housing is spaced from the main body and an assembled position wherein the housing and main body are in assembled relationship. With the housing and main body in assembled relationship, at least a part of the transverse slot is spaced along the periphery of the main body between the first slot and the surrounded opening.

In one form, the at least one fixing component is a component that is separate from the housing and main body and is extended into each of the housing and main body.

In one form, the main body has a periphery at which the first slot is formed. The main body has a second slot spaced peripherally on the main body from the first slot. The other of the legs of the "U" shape is directed into the second slot over a second length. The switch is embedded in the main body between the first and second slots.

In one form, the first and second slots are substantially straight and respectively have first and second lengths that are substantially parallel.

In one form, the housing has a peripheral shape. The receptacle has a shape complementary to the peripheral shape of the housing so that the main body is press fit into the receptacle and frictionally maintained in the receptacle with the housing and main body in assembled relationship.

In one form, the tethering system has an electrical connector on the elongate flexible component that is configured to be press fit to a connector on an electrical monitoring system to thereby integrate the conductive path defined by the at least one conductor flexible component into an electrical circuit in an electrical monitor system.

In one form, the invention is provided in further combination with an electrical monitoring system configured to generate a signal as an incident of the formed conductive path being interrupted. The conductive path is integrated into an electrical circuit that is part of the electrical monitoring system.

In one form, the elongate flexible component is a mechanical component that is fixed with respect to a support whereby with the tethering system engaging the portable article, the portable article is confined in movement away from the support a distance determined by a length of the elongate flexible component.

In one form, the at least one fixing component is movable relative to the housing and main body and is biased into one position wherein the at least one fixing component maintains the housing and main body in the assembled relationship.

In one form, the invention is provided in further combination with a tool that has a fitting that generates a magnetic attraction force between the tool fitting on the at least one fixing component to thereby cause the at least one fixing component to be moved from the one position into another position wherein the at least one fixing component no longer maintains the main body and housing in the assembled relationship.

In one form, there is a rib on one of the main body and housing that cooperates with a slot on the other of the main body and housing so as to guide the main body into and out of the receptacle.

BRIEF DESCRIPTION OF THE DRAWINGS

FIG. 1 is a schematic representation of a tethering system, according to the present invention, including an elongate flexible component with an associated loop that engages a portable article and connects between the portable article and a support relative to which the portable article is to be confined;

FIG. 2 is a schematic representation of the elongate flexible component in FIG. 1 having a conductor to allow integration into an electrical monitoring system as to produce a detectable signal in the event of a system breach;

FIG. 3 is a schematic representation of additional details regarding the connection of the elongate flexible component to the electrical monitoring system in FIG. 2;

FIG. 4 is a schematic representation showing further details of the inventive tethering system, as shown schematically in FIG. 1;

FIG. 11 is a cross-sectional view of the tethering system taken along line 11-11 of FIG. 10;

FIG. 12 is a fragmentary, front perspective view of the main body in FIG. 6 with an end of the elongate flexible component fixed thereto;

FIG. 13 is a top view of the components in FIG. 12;

FIG. 14 is a side elevation view of the components in FIGS. 12 and 13;

FIG. 15 is a view as in FIG. 14 from the opposite side;

FIG. 16 is a bottom view of the components in FIGS. 12-15;

FIG. 17 is a top perspective view of the housing in FIG. 6;

FIG. 18 is an enlarged, bottom view of the housing in FIG. 17;

FIG. 19 is an enlarged, top view of the housing in FIGS. 17 and 18;

FIG. 20 is a side elevation view of a portable article in the form of a handheld drill that is engaged by a closed loop on the inventive tethering system;

FIG. 21 is a front elevation view of a portable article in the form of a computer monitor with the inventive tethering system engaged therewith;

FIG. 22 shows the inventive tethering system defining a sub-loop that is engaged with a portable article having a fully surrounded opening;

DETAILED DESCRIPTION OF THE PREFERRED EMBODIMENT

Figures 5, 6:
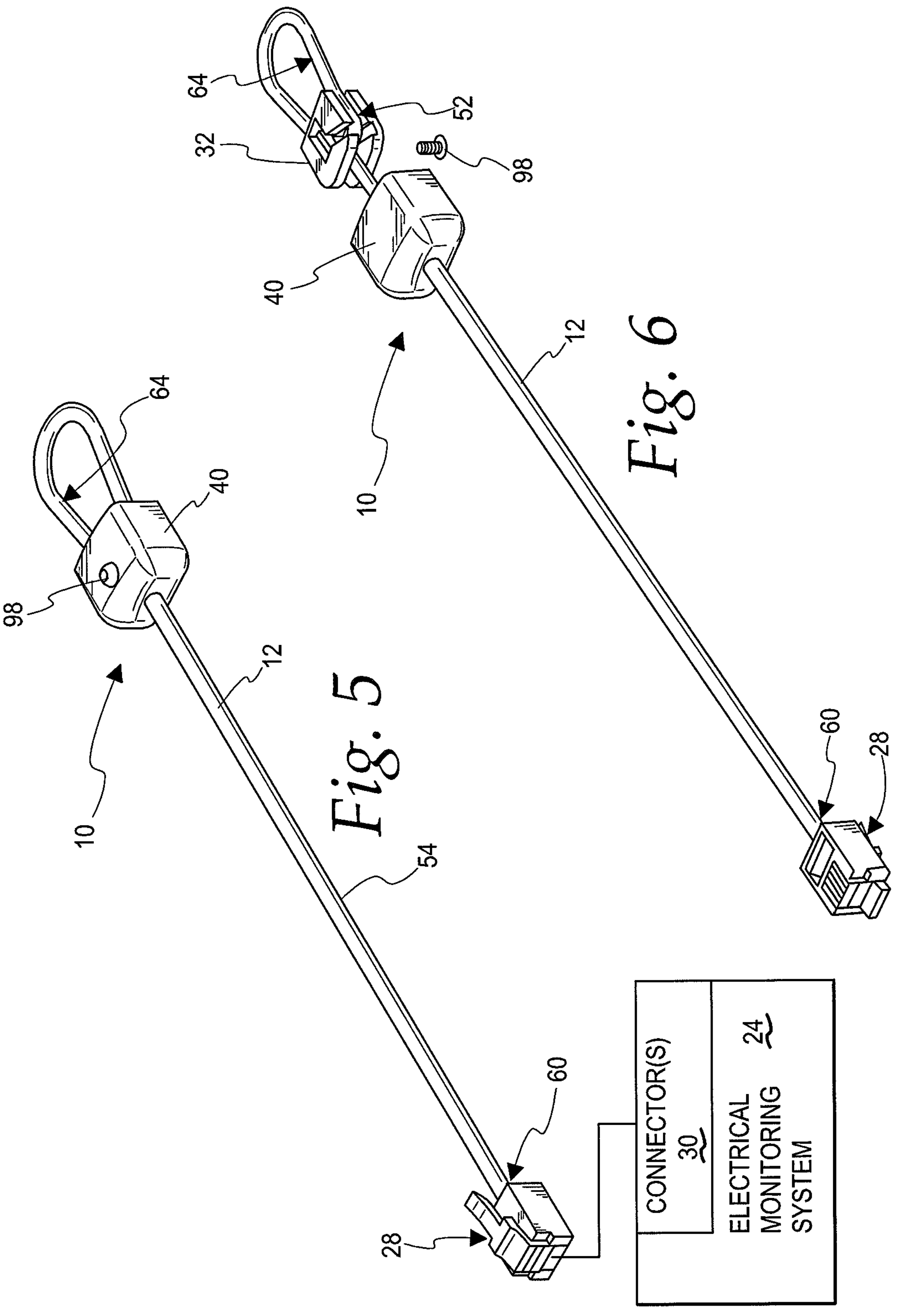
FIG. 5 is a front perspective view of one exemplary form of tethering system as shown schematically in FIGS. 1-4.
FIG. 6 is a view as in FIG. 5 from a rear perspective and wherein a housing and main body on the tethering system are separated to allow selection of a closed loop size formed using the elongate flexible component.

In FIG. 1, a tethering system, according to the present invention, is shown in schematic form at 10. The tethering system 10 has an elongate flexible component 12 that has a loop 14 formed thereby/thereon, used to engage a portable article 16. With the tethering system 10 engaging the portable article 16, the loop 14 extends around at least a part of the portable article 16.

The portable article 16 can take an unlimited number of forms with which the loop 14 can be used to directly engage the portable article 16 or connect to a part or parts connected to the portable article 16. This type of tethering system is commonly used on portable electronic devices. However, this category of portable article 16 is described herein as exemplary in nature only and should not be viewed as in any way limiting.

The elongate flexible component 12 is fixed with respect to a support 18, whereby with the tethering system 10 engaging the portable article 16, the portable article 16 is confined in movement away from the support 18 a distance determined by a length of the elongate flexible component 12.

The elongate flexible component 12 may be a mechanical component without any electrical current conducting capability or may incorporate at least one conductor 20, as shown in FIG. 2, that defines a conductive path that can be integrated into an electrical circuit 22 that is part of an electrical monitoring system 24. The electrical monitoring system 24 may take any of a number of different forms and commonly will have an associated signal generator 26 capable of generating a detectable signal in the event that, among other conditions, the conductive path is interrupted, as by disconnection of the elongate flexible component 12 from its engaged relationship with the portable article 16, severance of the elongate flexible component 12 occurs, including the at least one conductor 20 thereon, etc.

As shown schematically in FIG. 3, the elongate flexible component 12 may have one or more connectors 28 to establish electrical connection between the conductor(s) 20 and conductive elements (not shown) on the circuit 22. More specifically, the connector(s) 28 cooperates with connector (s) 30 associated with the circuit 22 on the electrical monitoring system 24. This may be a hardwired connection or, more preferably, a releasable connection which allows greater system flexibility in terms of setup, adaptability to different articles, etc.

Even with an electrical capability, the depicted elongate flexible component 12 functions as a mechanical constraint, when engaged with the portable article 16, confining movement of the portable article 16 away from the support 18 a distance determined by a length of the elongate flexible component 12.

FIG. 4 is a schematic representation of the tethering system 10, shown schematically in FIG. 1, and including additional details thereof. The tethering system 10 has a main body 32 with at least one slot 34. A part of the elongate flexible component 12 is fixed to the main body 32. This may be a permanent connection or a connection that can be established and releasably or permanently maintained at setup.

The elongate flexible component 12 is configured so that a length of the elongate flexible component 12 extending away from the fixed part of the elongate flexible component 12 can be formed into a U-shaped length 36 with spaced legs 38*a*, 38*b*. One of the spaced legs 38 is directed into the one/first slot 34 over a first length of the main body 32 and to beyond the main body 32 for connection to the support 18.

A housing 40 is provided, with the housing 40 and main body 32 configured so that the housing 40 and main body 32 can be placed in an assembled relationship wherein the housing 40 blocks the aforementioned one of the spaced legs 38 in the slot 34 over the first length of the main body. With this connection, friction forces generated between the elongate flexible component 12 and at least one of the main body 32 and housing 40 resist sliding of the elongate flexible component 12 along the slot 34 as would change a size/length of the "U" shape.

With the main body 32 and housing 40 in the assembled relationship, the "U" shape and at least one of the main body 32 and housing 40 cooperatively define a closed loop with an effective diameter.

With this construction, the tethering system 10 can be used to engage the portable article 16 by either: a) extending the closed loop around at least a part of the portable article 16; or b) extending a length of the elongate flexible component 12 through the closed loop to produce a secondary loop/sub-loop that can be extended around at least a part of the portable article 16. As noted above, structure may be added to the portable article 16 to engage the tethering system 10. For purposes of simplicity, this added structure will be considered herein to be a part of the portable article 16.

The schematic depictions in FIGS. 1-4 are intended to broadly disclose the inventive concepts. The specific forms of the invention, as described hereinbelow, are within the broad disclosure of the schematic showings in FIGS. 1-4. However, the invention is not limited to any of these specific forms, as the invention is more broadly directed to different forms of the components in each of these schematic showings and their interactions.

Specific forms of the invention will now be described with reference to FIGS. 5-19.

As noted, the elongate flexible component 12 may be a purely mechanical component or, as shown in FIGS. 5-19, with at least one, and in this case two, coextensive conductors 20. The conductors 20 extend between a switch 42 on the main body 32 and an electrical connector 28 shown in an exemplary form in FIGS. 5 and 6 as a releasable, press-fit plug, that engages the connector 30 on the electrical monitoring system 24 to define the aforementioned conductive path through the elongate flexible component 12, usable to integrate the conductive path into the electrical circuit 22 on the electrical monitoring system 24.

The details of the construction of the switch 42 are not critical to the present invention. It suffices to say that the switch has an associated actuator 46 that is movable between a first position, as shown in exemplary FIGS. 13 and 16, and a second position, as shown in FIG. 11. The actuator 46 is spring-biased into its first position wherein the switch 42 is in a first state wherein the conductive path defined by the conductors 20 is interrupted. By depressing the actuator 46 against the spring force, the actuator is changed into the second position, wherein the switch is in a second state and the conductive path through the conductors 20 is formed.

In the depicted form, the main body 32 has an overall squared block shape. The precise shape of the main body 32 is not limited or critical. As depicted, the main body 32 has a cavity 48 which is open at a front surface 50, with the designation "front" and all other orientations being arbitrary in nature.

The main body 32 has an outer periphery at 52 at which there are three peripherally spaced slots 34*a*, 34*b*, 34*c*. Each of the slots 34*a*, 34*b*, 34*c* has a curved cross-sectional shape generally conforming to the cross-sectional shape of the outer circumferential surface 54 of the elongate flexible component 12. These shapes may be nominally matched with a slight connected looseness or may be relatively dimensioned so that the elongate flexible component 12 can be press fit into the slots 34*a*, 34*b*, 34*c*, along lengths thereof, to be frictionally held therewithin. Preferably at least the slot 34*b* maintains a firm connection with the elongate flexible component. Typically, the outer circumferential surface 54 of the elongate flexible component 12 is made from a rubber-like material that is slightly compressible to facilitate deformation to thereby enhance frictional engagement between the main body 32 and the elongate flexible component 12.

In one preferred form, the main body 32 is made from a non-metal material, though metal could be utilized for its construction.

The slots 34*a*, 34*b*, 34*c* each extends along a length of the periphery 52 of the main body 32.

The slots 34*a*, 34*b* are side slots that open away from each other, with the slot 34*c* residing at the bottom of the main body 32 and extending in a direction/path transversely to the paths/lengths of the slots 34*a*, 34*b*.

The elongate flexible component 12 depicted can be considered to be fixed to the main body 32 in two different respects. By reason of fixing the switch 42 in the cavity 48, the separation of the elongate flexible component 12 from the main body 32 may be precluded by reason of its being fixed to the switch 42. It is also contemplated that the elongate flexible element 12 can be fixed to the main body 32 by fixing an extension 56 of one of the U-shaped legs 38*a* on the aforementioned U-shape length 36 to the main body 32 along the slot 34*b*. This extension 56 may be permanently fixed to the main body 32 at the depicted location with or without the requirement of any precise shape of the slot 34*b*, as shown in exemplary form in FIG. 13, and potentially without any "slot". A strong frictional engagement, use of an adhesive, etc. effect "fixing", and may be desired to avoid producing tension on the conductors 20.

As depicted, the leg 38*a* of the U-shaped portion 36 is fixed with respect to the main body 32 by a tight press fit connection of the extension 56 of the leg 38*a* within the slot 34*b*.

The elongate flexible component 12 is formed to produce a bight portion 58 from where the other leg 38*b* of the U-shaped portion extends to an end at 60 which is joined to the connector 28.

The leg 38*b* extends into the slot 34*a* over a length L of the main body 32. The particular selected length region at which the elongate flexible component 12 is directed into the slot 34*a* determines the distance D of the bight 58 from the top 62 of the main body 32 and thus the effective diameter of a closed loop 64 bounded by the elongate flexible component 12 and the top 62 of the main body 32. That is, by changing the length region of the elongate flexible component 12 that is directed into the slot 34*a*, the length of the "U" shape and diameter of the closed loop 64 may be selectively increased or decreased within a range dictated by the overall length of the elongate flexible component 12.

In the depicted form, the extension 56 of the leg 38*a* overlies a length of the periphery 52 that is slightly less than the length L by reason of there being a cutout formed at 66 through which the conductors 20 can communicate to extend up to the switch 42 in the cavity 48.

In the depicted form, the peripherally spaced slots 34*a*, 34*b* are substantially straight with lengths/paths that are substantially parallel. This is not a requirement. As also depicted, but not required, the switch 42 is embedded in the main body 32 in a space between the slots 34*a*, 34*b*.

The housing 40, as depicted, has an overall shape/volume nominally matched to, but slightly larger than, the outer shape/volume of the main body 32. The housing 40 defines a cup-shaped receptacle 68 into which at least a portion of the main body 32 can be extended. Preferably, the volume of the receptacle 68 is nominally matched to the surrounding volume of the main body, with its precise shape not critical. Opposite sides 70, 72 of the main body 42 are generally parallel to match the lines of the slots 34*a*, 34*b*. This allows the main body 32 to be slidingly pressed into the receptacle 68. While not required, in the form shown, the depth of the receptacle 68 is such that the top 62 of the main body is generally flush with the top 74 of the housing 40 at an edge 76 which surrounds the receptacle 68.

A friction holding between the main body 32 and housing 40 results in the depicted form. This frictional holding is not required and connection may also be effected as by making part of one or both of the body 32 and housing 40 with an elastic nature. For example, the housing 40 may be stretched to accept the body 32. Use of cooperating connectors is also contemplated.

With the housing 40 and main body 32 in assembled relationship, facing surfaces 78, 80 bounding the receptacle 68 closely overlie the lengths of the elongate flexible component 12 directed/press fit into the slots 34*a*, 34*b* to block the elongate flexible component 12 therein. Relative dimensions are such that the surfaces 78, 80 squeeze the elongate flexible component 12 into the slots 34*a*,34*b* so that the lengths of the elongate flexible component 12 within the slots 34*a*, 34*b* are frictionally held against the main body 32, as well as the housing 40, to resist shifting of the elongate flexible component 12 in a lengthwise direction within each slot 34*a*, 34*b*. This squeezing action is desirable for greater holding strength but no required.

The switch 42 is positioned so that the biased actuator 46 in its first position, projects into the slot 34*a*. The actuator 46 is configured so that upon the elongate flexible component 12 being pressed into the slot 34*a*, the actuator 46 is moved against a bias force from its first position into its second position to form the aforementioned conductive path. Drawing the elongate flexible component 12 out of the slot 34*a* allows the actuator 46 to be spring biased back into its first position, which interrupts the conductive path, which is a condition resulting when the overall system has not been armed or has been breached.

Figure 7:
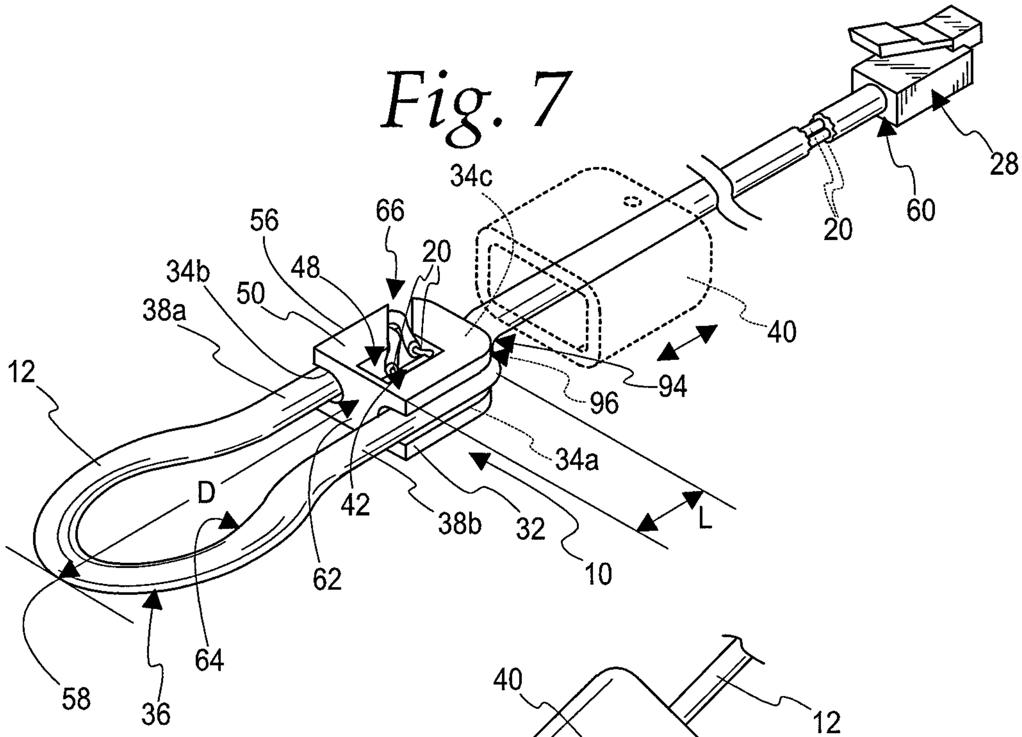
FIG. 7 is a view as in FIG. 6, enlarged and from a different perspective.
Figure 9:
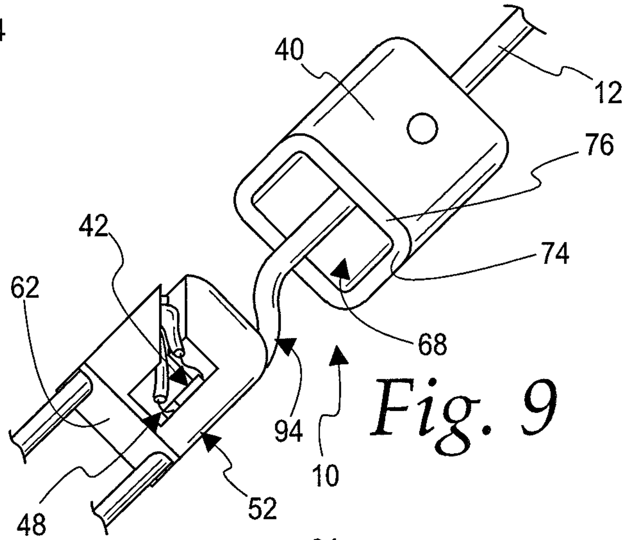
FIG. 9 is a fragmentary view showing the components in FIG. 6 from a different perspective.
Figure 8:
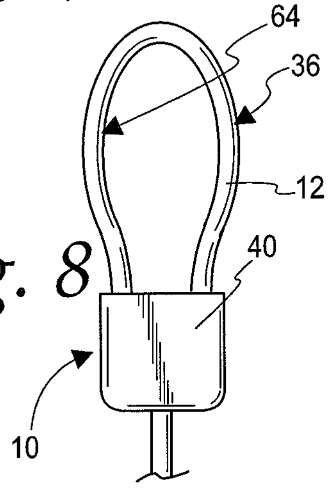
FIG. 8 is a rear, fragmentary view of the housing and closed loop in FIGS. 5-7.
Figure 10:
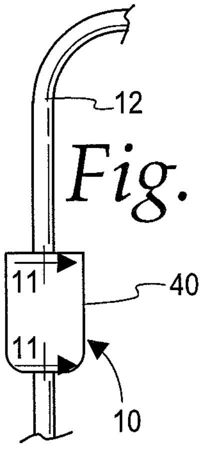
FIG. 10 is a fragmentary, side elevation view of the tethering system in FIGS. 5-9.
Figure 23:
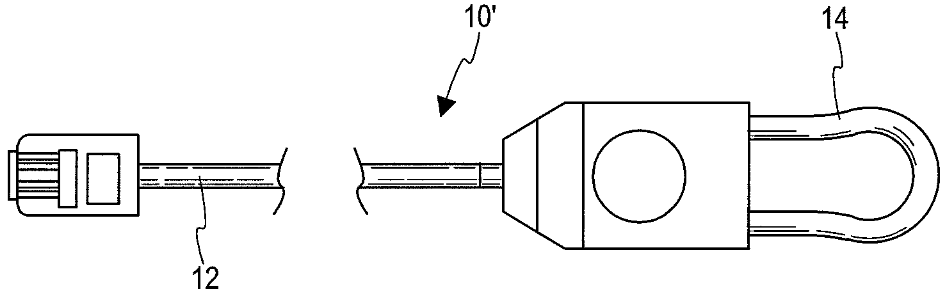
FIG. 23 is a front elevation view of a modified form of tethering system, according to the present invention.
Figure 24:
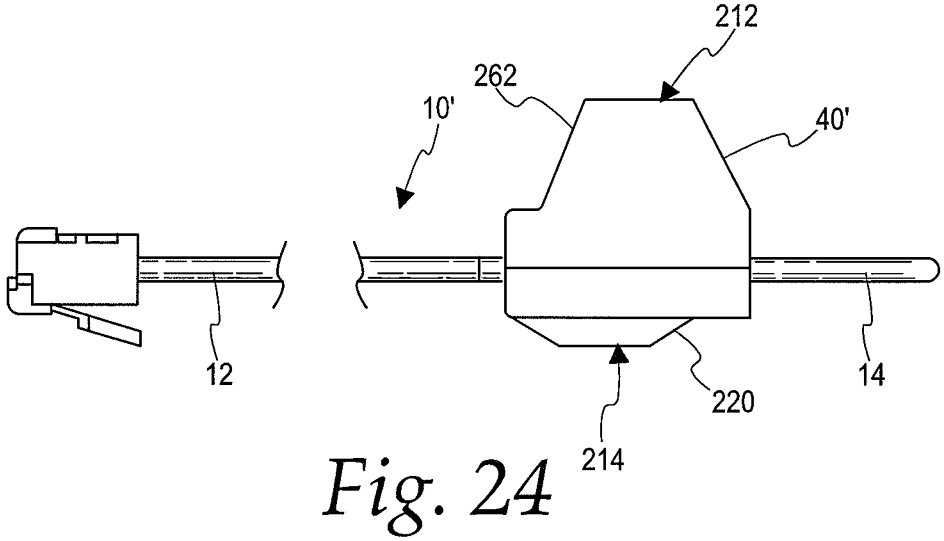
FIG. 24 is a side elevation view of the tethering system in FIG. 23.
Figure 25:
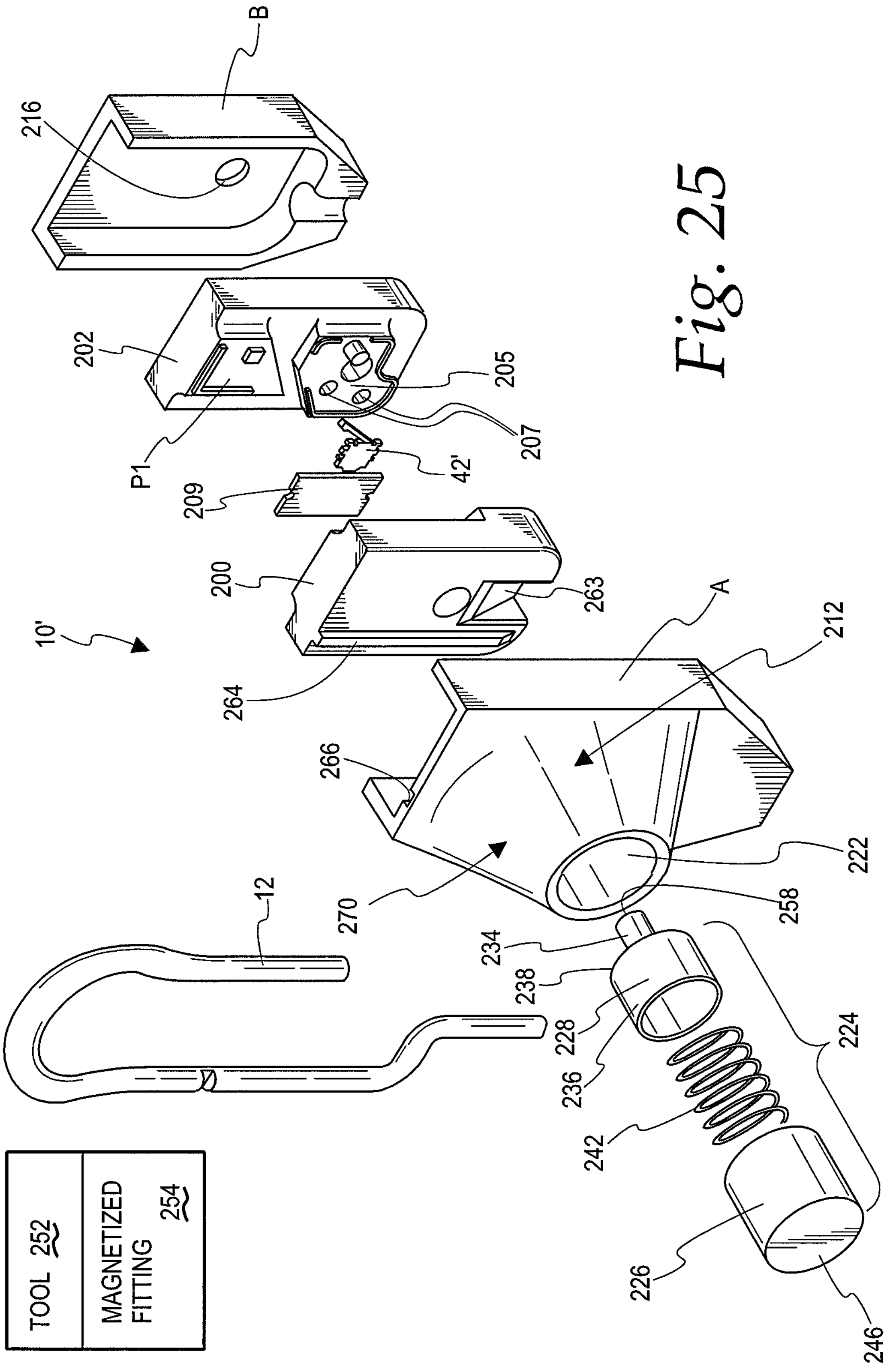
FIG. 25 is a fragmentary, exploded, perspective view of the tethering system as shown in FIGS. 23 and 24.
Figure 26:
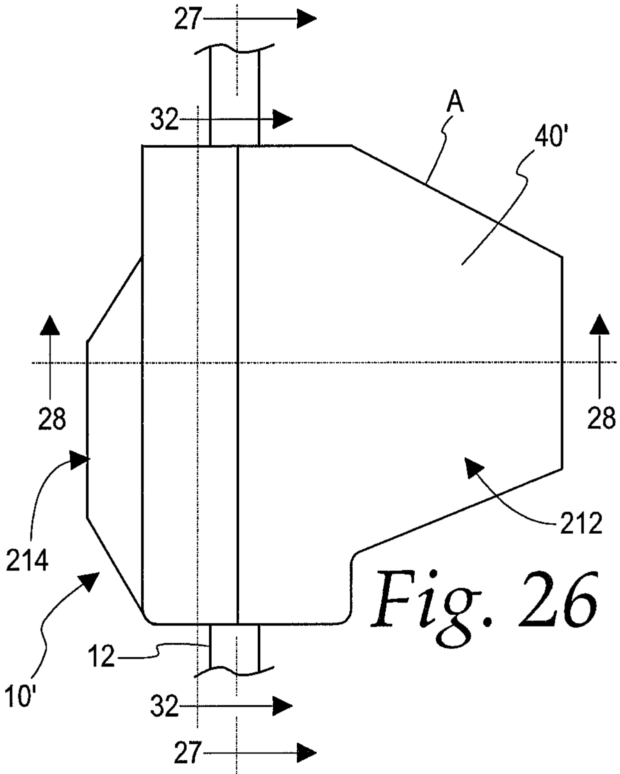
FIG. 26 is a fragmentary elevation view of the tethering system taken from the side opposite that in FIG. 24.

The main body 32 has a curved shape at its bottom peripheral region at 82. This facilitates guided movement of the main body 32 into the housing receptacle as the housing 40 is moved from a pre-assembly position, as shown in FIG. 7, spaced fully from the main body 32, into an assembled position wherein the housing 40 and main body 32 are in assembled relationship, as shown in FIGS. 5 and 8.

The housing 40 has an opening 84 through a bottom wall 86 thereof to allow passage therethrough of the elongate flexible component 12. The opening 84 is provided approximately midway between the sides 88, 90 of the housing 40 and is shown to be fully surrounded on the bottom wall 86.

The leg 38*b* of the U-shaped portion 36 extends through the receptacle 68 and the wall opening 84. The wall opening 84 is slightly larger than the diameter of the elongate flexible component 12 whereby the housing can be slid guidingly along the length of the elongate flexible component 12 as it is moved from the pre-assembly position into the assembled position therefor.

The housing 40 and main body 32 are configured so that with the main body 32 and housing 40 in assembled relationship, a bottom surface 92 bounding the receptacle 68 on the housing 40 urges a length of the elongate flexible component at 94 into the slot 34*c*.

As seen in FIG. 7, with the housing 40 advanced towards the main body 32, the length 94 is required to bend against a corner 96 on the main body 32. As depicted, the slot 34*c* extends in a path that is transverse to the path of the slot 34*a*. With the assembled relationship between the housing 40 and main body 32 realized, the elongate flexible component 12 assumes an "L" shape where it resides in the slots 34*a*, 34*c* with a slight pressure applied between the elongate flexible component 12 and the main body 32 where the elongate flexible component 12 wraps against the corner 96.

The elongate flexible component 12 is required to bend further and generally oppositely to pass through the opening 84. Thus, the elongate flexible component is formed into an overall "S" shape between the slot 34*a* and the opening 84. This relatively complex shape cooperates with the body 32 and housing 40 to resist lengthwise shifting of the elongate flexible component 12 relative thereto-thereby firmly maintaining a selected closed loop diameter.

With the above construction, frictional forces can be generated between the elongate flexible component 12 and at least one of the main body 32 and housing 40 to resist sliding of the elongate flexible component along principally the slots 34*a* and 34*c*, as well as the slot 34*b*. Only one of the slots 34*a*, 34*c* is actually required to produce the necessary frictional holding force on the elongate flexible component 12 This resists changing of the selected size of the closed loop 64, potentially without producing any stress points on the elongate flexible component 12 as might compromise its integrity.

The closed loop 64 is bounded by the elongate flexible component 12 and at least one of the housing 40 and main body 32.

As noted above, the peripheral shapes of the main body 32 and housing 40 are preferably selected to allow the main body 32 to be press fit into the receptacle 68 on the housing 40 to frictionally maintain an assembled relationship. Different structures may be devised to prevent separation of the housing 40 and main body 32 in their assembled relationship without relying primarily on this frictional connection. For example, any type of snap fit connector could be provided to avoid separation.

As depicted, a releasable connection between the housing 40 and main body 32 is provided to facilitate reconfiguration and reuse. A fixing component 98, separate from the main body 32 and housing 40, is directed from externally of the housing 40 through the housing 40 and into the main body 32. The fixing component 98 is shown as a threaded fastener that is turned to effect connection and separation. A security head 100 is incorporated that requires a special security tool to turn the fixing component 98. A suitable security tool is shown schematically at 102 in FIG. 17.

As explained previously, with reference to FIG. 11 it can be seen clearly that the diameter of the closed loop 64 can be changed from the solid line configuration to that in dotted lines by shifting the elongate flexible component 12 within the slot 34*a* in the direction of the arrow 104. This selection is actually made by directing different lengthwise regions of the elongate flexible component 12 into the slot 34*a*.

By releasing the fixing component 98, the main body with the engaged lengths of the elongate flexible component 12 can be withdrawn from the receptacle 68 to allow selection of a different desired closed loop size.

As shown in FIG. 20, the closed loop 64 on the tethering system 10 can be directed around a member 104 and extend partially around a fully surrounded opening 106 bounded in part thereby, with the member 104 in this case being part of a trigger guard for a handheld drill 108.

In FIG. 21, the closed loop 64 can be restricted around a necked portion 110 of a computer monitor 112. The size of the loop 64 can be reduced to the desired size with the housing 40 fully separated from the main body 32. When the desired loop diameter is arrived at, the housing 40 can be pressed over the main body 32 to fix the size of the loop 64.

In FIG. 22, a further application of the tethering system 10 is shown wherein a free end portion of the elongate flexible component 12 is directed through the closed loop 46 to define a closed sub-loop 114 which extends through a fully surrounded opening 116 on a portable article 118, which is not limited in nature.

A modified form of tethering system, according to the present invention, is shown at 10' in FIGS. 23-40. Elements on the tethering system 10', corresponding to those on the tethering system 10 but with a modification thereto, will be identified with a corresponding reference numeral with the addition of a "'".

The tethering system 10' utilizes the elongate flexible component 12 which has the loop 14 formed thereby/thereon.

The tether system 10' differs from the tethering system 10 primarily by reason of using a different form of the main body 32' and the housing 40' that cooperates therewith.

The main body 32' is made with first and second joinable parts 200, 202 whereas the main body 32 is shown formed as a single piece.

The main body part 200 has a flat surface 204 that is placed facially against a flat surface 205 on the second main body part 202 with the first and second main body parts joined together to define the main body 32', corresponding to the main body 32. Spaced locating pins 206 on the main body part 200 are press fit into complementary receptacles 207 on the main body part 202 to consistently relatively align the joined main body parts 200, 202.

The surfaces 204, 205 on the first and second main body parts 200, 202 are undercut to respectively define discrete volumes 208*a*, 208*b* that combine to produce a volume 208 with the first and second main body parts 200, 202 joined. The switch 42' is mounted within the volume 208 on a board 209 with the combined switch and board 209 maintained captive between a discrete pad P1 on the second main body part 202 and a facing surface S on the first main body part 200.

The two-part main body construction facilitates mounting of the switch 42' and allows the switch to be maintained captive, and potentially stabilized, between the pad P1 and surface S and to be shielded in the covered volume 208 together with the conductors 20, where they are connected to and project away from, the switch 42'.

Figure 27:
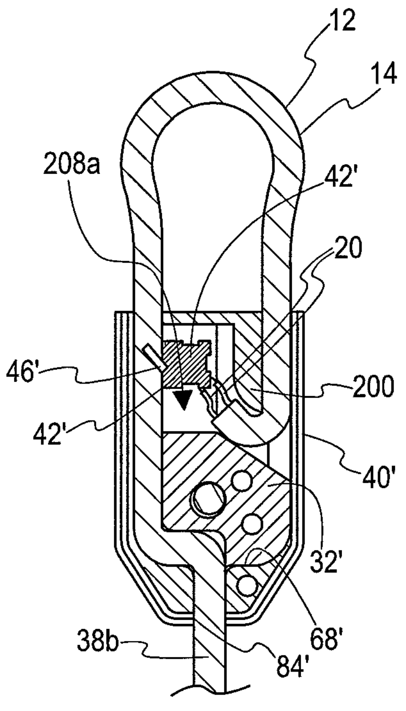
FIG. 27 is a cross-sectional view of the tethering system taken along line 27-27 of FIG. 26.

As can be seen by comparing FIGS. 11 and 27, the flexible component 12 wraps against the main body 32' in substantially the same manner that the flexible component 12 wraps against the main body 32.

While as previously mentioned, the details of the switch 42, 42' are not critical, the switch 42' is made with a lever actuator 46' as opposed to the actuator 46 that utilizes a spring-biased component that is moved in a translational path between corresponding first and second positions through which the conductive path is either established or interrupted.

The housing 40' defines a cup-shaped receptacle 68' into which the main body 32' can be extended. The volume of the receptacle 68' is nominally matched to the surrounding volume of the main body 32'.

With the leg 38*b* of the flexible component 12 directed through the wall opening 84', the main body 32' can be guidingly advanced into the receptacle 68' as the elongate flexible component 12 slides through the wall opening 84'.

Since the elongate flexible component 12 engages the main body 32' in substantially the same way that it engages the main body 32, the details of the engagement of the elongate flexible component 12 with the main body 32' need not be repeated herein.

Whereas all of the wall portions making up the housing 40 have the same general thickness, spaced front and rear wall portions 212, 214 on the housing 40', on opposite sides of the receptacle 68', are strategically thickened to facilitate more secure fixation of the housing 40' to the main body 32' and to allow incorporation of a different type of releasable connection between the housing 40' and main body 32' than on the tethering system 10.

The rear wall portion 214 has an opening 216 therethrough that aligns with a blind bore 218 in the main body 32', formed cooperatively by the main body parts 200, 202, with the main body 32' and housing 40' in assembled relationship. The thickness of the wall portion 214 tapers away from the opening 216, whereby the thickness of the wall portion 214 is greatest around and in the vicinity of the opening 216. Accordingly, the wall portion 214 is rigidified around the opening 216 to stably support the fixing component 98' that is directed through the wall opening 216 and into the main body bore 218. The fixing component 98' is shown with a substantially flush, or slightly recessed placement, which is not a requirement, and may have the aforementioned security feature described with respect to the fixing component 98, above, to facilitate manipulation by only authorized personnel.

The front wall portion 212 is considerably thicker than the wall portion 214 and has a stepped through bore 222 that accommodates an operating insert 224. The operating insert 224 consists of a cup-shaped housing 226 that is pressed into the bore 222 to be fixedly connected thereto. A stepped diameter plunger/fixing component 228 extends into a receptacle 229 on the housing 226 and is movable guidingly along a cylindrical surface 230 bounding the receptacle 229 along an axis 231 of the housing 226 in opposite directions, as indicated by the double-headed arrow 232.

The plunger 228 has a smaller diameter portion 234 that transitions to a larger diameter portion 236, with an annular shoulder 238 defined where the smaller diameter portion 234 and larger diameter portion 236 transition. The larger diameter portion 236 slides guidingly against the surface 230 along the axis 231.

With the smaller diameter portion 234 directed into a blind bore 240 on the body 32', the body 32' is positively blocked from being withdrawn from the receptacle 68' in the main body 32'.

A coil spring 242 is captively loaded between a surface 244 on the plunger 228 and a wall 246 on the housing 226. The wall 246 has a stub shaft 247 projecting therefrom and into the coil spring 242 to effect stabilization thereof. The spring 242 is loaded so that the plunger 228 is normally biased in the direction of the arrow 250, thereby urging the reduced diameter portion of the plunger 228 into the bore 240.

The plunger 228 is preferably made at least partially from a metal that can be magnetically attracted by a tool 252 with a magnetized fitting 254 through the wall 246. Cooperating magnets might be utilized or the metal and magnet locations may be reversed. The entire housing 226, or only parts thereof, such as the wall 246, may be made of a material through which the required magnetic operating force may be generated.

Figure 28:
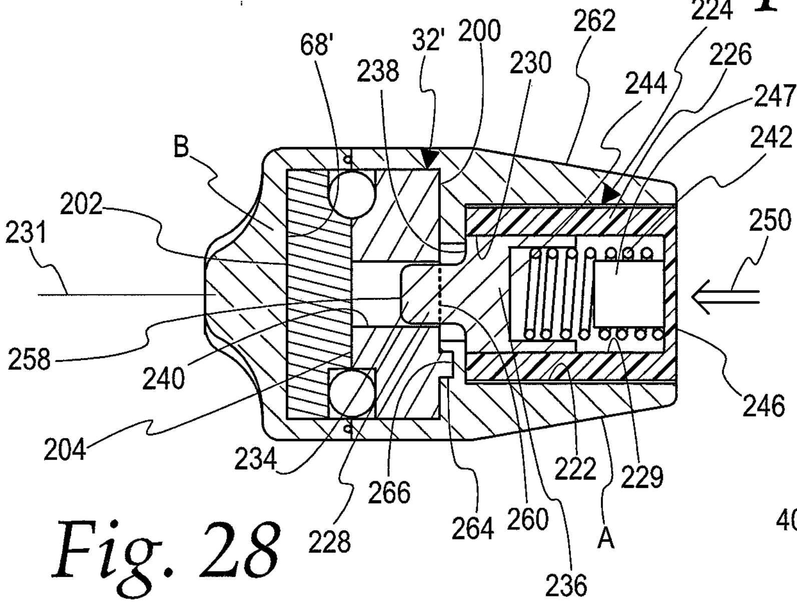
FIG. 28 is a cross-sectional view of the tethering system taken along line 28-28 of FIG. 26.
Figure 29:
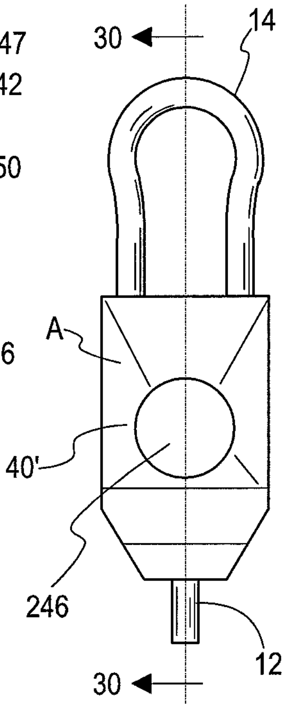
FIG. 29 is a fragmentary, front elevation view of the tethering system in FIGS. 23-28.
Figure 30:
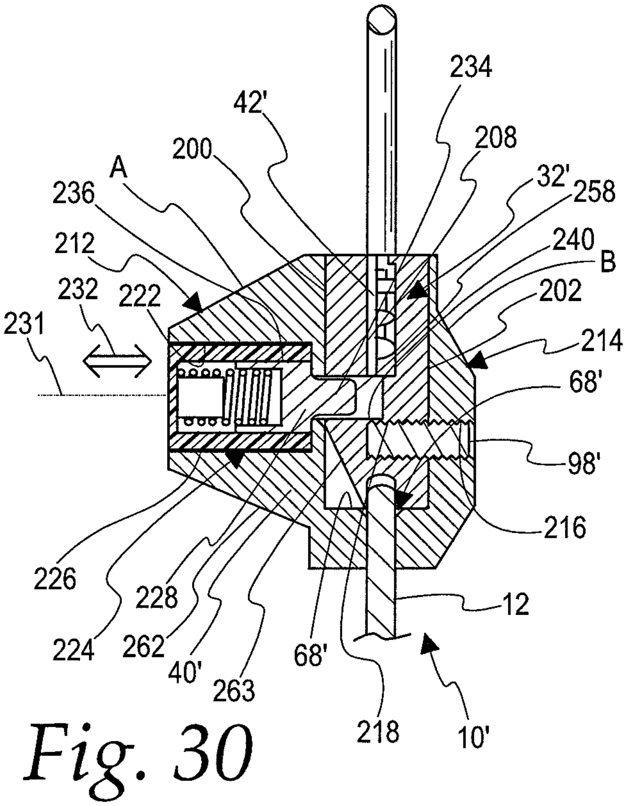
FIG. 30 is a cross-sectional view of the tethering system taken along line 30-30 of FIG. 29.
Figure 31:
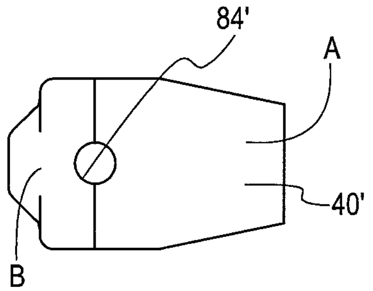
FIG. 31 is a bottom view of the tethering system in FIGS. 23-30.
Figure 32:
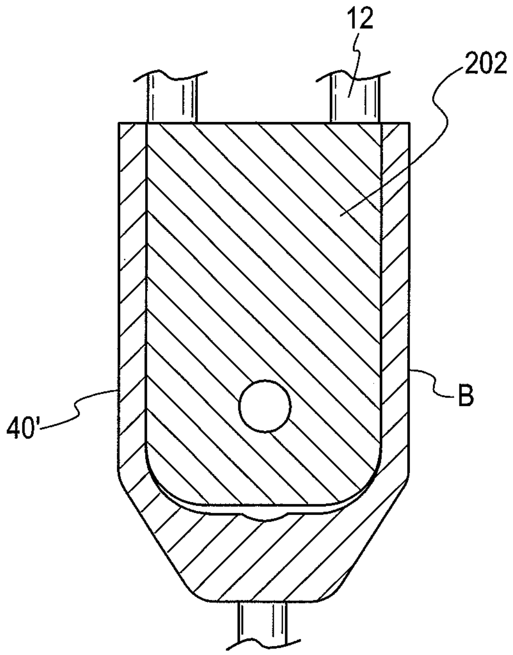
FIG. 32 is a cross-sectional view of the tethering system taken along line 32-32 of FIG. 26.
Figure 33:
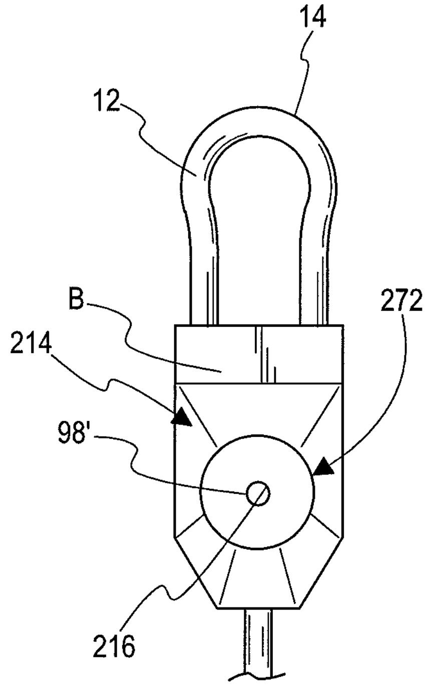
FIG. 33 is a fragmentary, rear elevation view of the tethering system in FIGS. 23-32.
Figure 34:
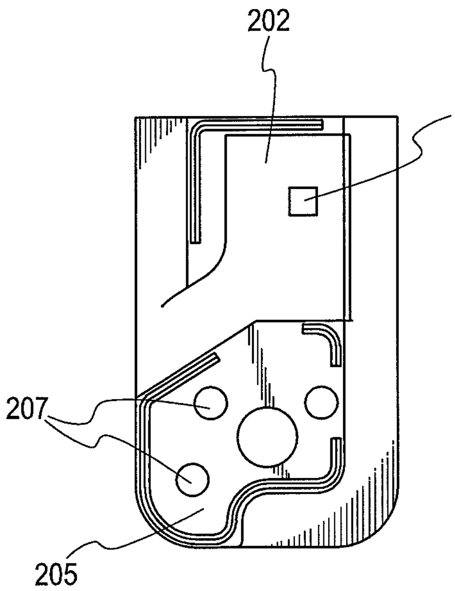
FIG. 34 is a rear elevation view of one of two joinable parts making up a main body on the tethering system in FIGS. 23-33.
Figure 35:
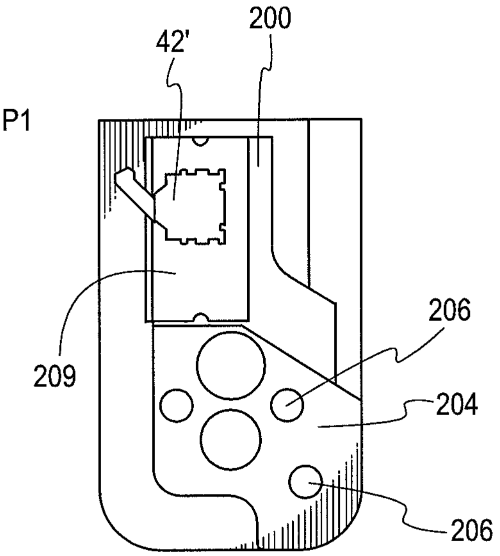
FIG. 35 is a front elevation view of a part that cooperates with the part in FIG. 34 to define the main body.
Figure 36:
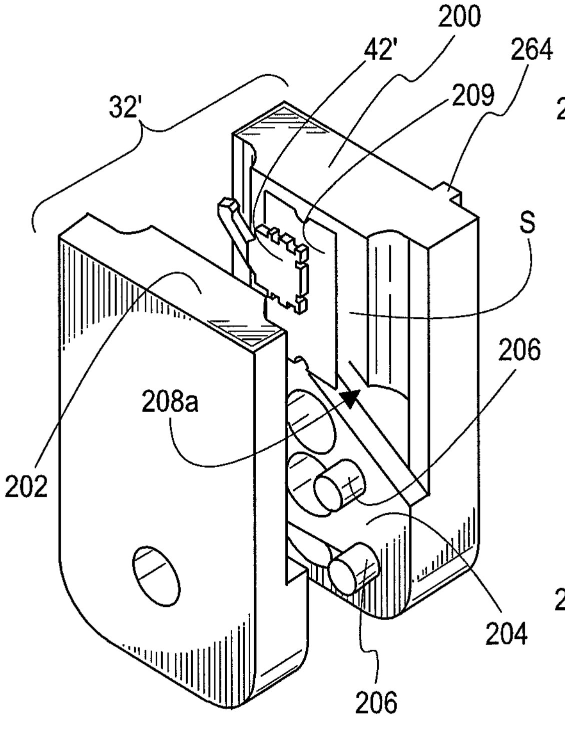
FIG. 36 is an exploded perspective view of the main body parts in FIG. 34 and FIG. 35.
Figure 37:
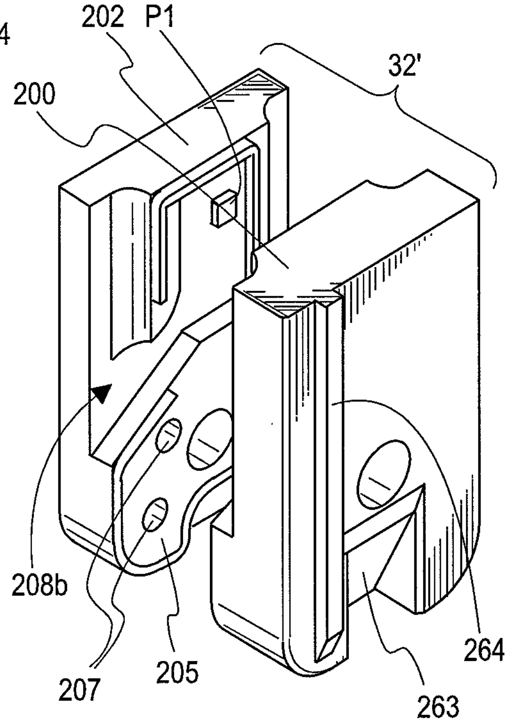
FIG. 37 is an exploded view of the parts in FIG. 36 taken from a different perspective.
Figure 38:
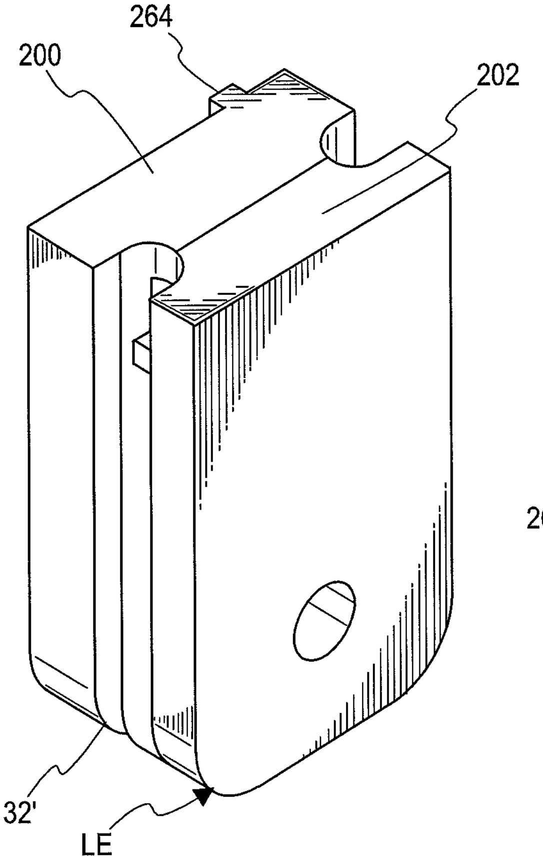
FIG. 38 is a perspective view of the parts in FIGS. 36 and 37 in joined relationship.
Figure 39:
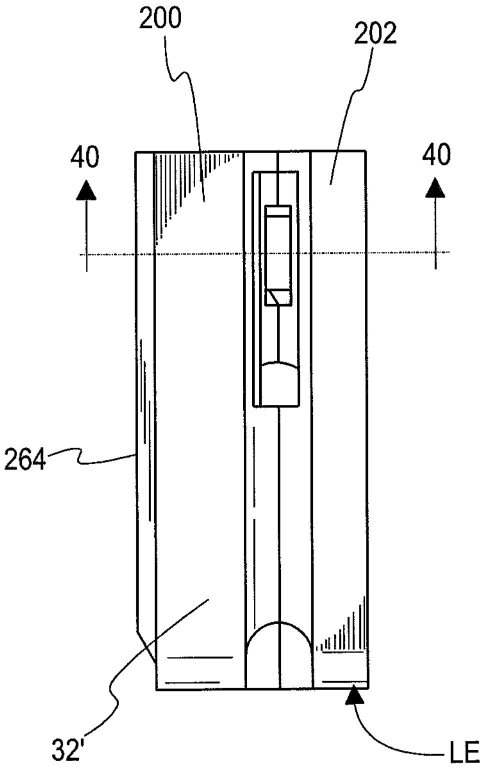
FIG. 39 is a side elevation view of the joined parts in FIG. 38.
Figure 40:
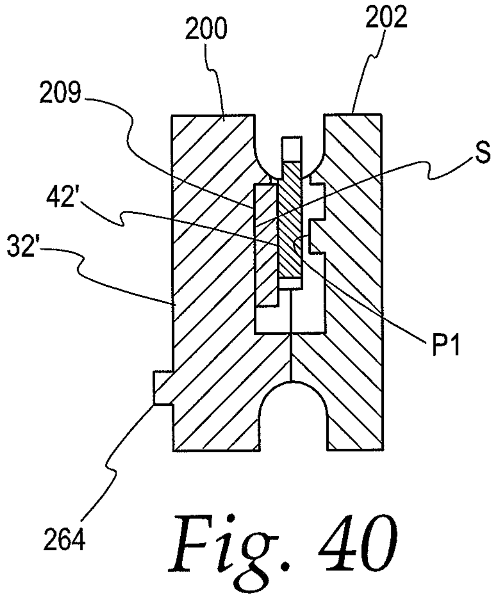
FIG. 40 is a cross-sectional view of the main body parts taken along line 40-40 of FIG. 39.

Accordingly, the plunger 228 is normally biased to an engaged position as shown in FIG. 28. By presenting the fitting 254 on the tool 252 at the wall 246, a magnetic attraction force is generated that urges the plunger 228 against the force generated by the spring 242, oppositely to the direction indicated by the arrow 250, until a leading end 258 of the plunger moves out of the bore 240 to at least the location indicated by the dotted line 260, whereupon the main body 32' can be separated from the receptacle 68'.

The surface 262 on the wall portion 212 tapers away from the location of the wall 246 so that the wall portion 212 is thickest in the region surrounding the bore 222. Accordingly, the operating insert 224 can be stably mounted to allow a firm, locked connection to be maintained between the main body 32' and the housing 40'.

The main body 32' has a cam surface 263 that progressively wedges the plunger 228 to a position whereby the leading end 258 moves to the dotted line position in FIG. 28 to prevent hangup of the main body 32' as it is being directed into the receptacle 68'.

The main body 32' has a rounded and tapered lower end LE to guide the body 32' into the receptacle 68'.

To facilitate manufacture, the housing 40' is made with at least two parts A, B that can be suitably fixed together, as by permanent bonding.

The main body 32' is also provided with a rib 264 on the main body part 202 that moves within a complementary slot 266 on the wall portion 212 to thereby consistently guide the main body 32' into and out of the receptacle 68'. The rib 264 may extend fully between the ends of the main body 32' or may have a shorter, or an interrupted, configuration. The thickened and rigidified wall portion 212 maintains the straight configuration of the slot 266 to minimize binding resulting from distortion of the main body 32' and/or housing 40' as the main body 32' is guided into the receptacle 68' and withdrawn therefrom.

The exposed contoured surfaces 270, 272 on the wall portions 212, 214, respectively, are preferably made without any sharp corners that may hang up on surrounding objects or cause discomfort when the tethering system 10' is engaged by a user.

While both of the wall portions 212, 214 are each designed to support an anchoring component, anchoring might be effected by using only one form of anchoring as shown on either of the walls 212, 214.

The above are exemplary uses and are not intended to be limiting in nature.

The foregoing disclosure of specific embodiments is intended to be illustrative of the broad concepts comprehended by the invention.

The invention claimed is:

1. In combination:

a portable article; and a tethering system for the portable article, the tethering system comprising:

an elongate flexible component;

a main body having a first slot; and a housing, a part of the elongate flexible component fixed to the main body, the elongate body configured so that a length of the elongate flexible component extending away from the fixed part of the elongate flexible component can be formed into a "U" shape with spaced legs with one of the spaced legs of the "U" shape directed into the first slot over a first length of the main body and to beyond the main body for connection to a support, the housing and main body configured so that the housing and main body can be placed in an assembled relationship wherein the housing blocks the one of the spaced legs of the "U" shape in the first slot on the main body over the first length whereby friction forces generated between the elongate flexible component and at least one of the main body and housing resist sliding of the elongate flexible component along the first slot as would change a size of the "U" shape, wherein with the main body and housing in the assembled relationship the "U" shape and at least one of the main body and housing cooperatively define a closed loop with an effective diameter, wherein the tethering system can be used to engage the portable article by either: a) extending the closed loop around at least a part of the portable article; or b) extending a length of the elongate flexible component through the closed loop to produce a secondary loop that can be extended around at least part of the portable article.

2. The combination according to claim 1 wherein the elongate flexible elongate element, main body, and housing are configured so that by selecting a length region of the one of the spaced legs that is directed into the first slot on the main body, a desired effective diameter for the closed loop can be selected over a range of diameters.

3. The combination according to claim 1 wherein the housing defines a cup-shaped receptacle and with the housing and main body in assembled relationship at least a portion of the housing is advanced into the receptacle and the housing blocks the elongate flexible component in the first slot over at least a part of the first length.

4. The combination according to claim 3 wherein the housing has a surrounded opening through which the elongate flexible component extends so that the housing can be slid guidingly along the elongate flexible component from a pre-assembly position wherein the housing is spaced from the main body and an assembled position wherein the housing and main body are in the assembled relationship.

5. The combination according to claim 1 wherein the main body has a periphery at which the first slot is formed and the main body has a second slot spaced peripherally on the main body from the first slot and the other of the legs of the "U" shape is directed into the second slot over a second length of the main body.

6. The combination according to claim 5 wherein the first and second slots open in opposite directions away from each other.

7. The combination according to claim 1 wherein the tethering system further comprises at least one fixing component that maintains the housing and main body in the assembled relationship.

8. The combination according to claim 1 wherein the elongate flexible component comprises at least one conductor that defines a conductive path through the elongate flexible component that can be used to integrate the conductive path defined by the at least one conductor into an electrical circuit in an electrical monitoring system capable of generating a detectable signal in the event that the conductive path is interrupted.

9. The combination according to claim 8 wherein the tethering system comprises a switch on the main body changeable between: a) a first state wherein the conductive path is interrupted; and b) a second state wherein the conductive path is formed, wherein the switch has an actuator that is changed from a first position into a second position, the switch in the first state with the switch in the first position and changed into the second state as an incident of the switch being changed from the first position into the second position.

10. The combination according to claim 9 wherein at least a part of the actuator resides in the first slot and is configured to be changed from the first position into the second position as an incident of the one of the legs of the "U" shape being directed into the first slot.

11. The combination according to claim 10 wherein the actuator is normally biased into the first position.

12. The combination according to claim 1 wherein the main body has a periphery at which the first slot is formed, the first slot having a length extending in a first path, the main body has a transverse slot having a length extending in a second path transverse to the first path and with the housing and main body in the assembled relationship the housing blocks a length of the elongate flexible component extending away from the fixed part of the elongate flexible component into the transverse slot.

13. The combination according to claim 12 wherein the housing has a surrounded opening through which the elongate flexible component extends so that the housing can be slid guidingly along the elongate flexible component from a pre-assembly position where the housing is spaced from the main body and an assembled position wherein the housing and main body are in assembled relationship and with the housing and main body in assembled relationship at least a part of the transverse slot is spaced along the periphery of the main body between the first slot and the surrounded opening.

14. The combination according to claim 7 wherein the at least one fixing component comprises a component that is separate from the housing and main body and is extended into each of the housing and main body.

15. The combination according to claim 9 wherein the main body has a periphery at which the first slot is formed and the main body has a second slot spaced peripherally on the main body from the first slot, the other of the legs of the "U" shape is directed into the second slot over a second length and the switch is embedded in the main body between the first and second slots.

16. The combination according to claim 5 wherein the first and second slots are substantially straight and respectively have first and second lengths that are substantially parallel.

17. The combination according to claim 3 wherein the housing has a peripheral shape and the receptacle has a shape complementary to the peripheral shape of the housing so that the main body is press fit into the receptacle and frictionally maintained in the receptacle with the housing and main body in assembled relationship.

18. The combination according to claim 8 wherein the tethering system comprises an electrical connector on the elongate flexible component that is configured to be press fit to a connector on an electrical monitoring system to thereby integrate the conductive path defined by the at least one conductor flexible component into an electrical circuit in an electrical monitor system.

19. The combination according to claim 18 further in combination with the electrical monitoring system configured to generate a signal as an incident of the formed conductive path being interrupted with the conductive path integrated into an electrical circuit that is part of the electrical monitoring system.

20. The combination according to claim 1 wherein the elongate flexible component is a mechanical component that is fixed with respect to a support whereby with the tethering system engaging the portable article, the portable article is confined in movement away from the support a distance determined by a length of the elongate flexible component.

21. The combination according to claim 7 wherein the at least one fixing component is movable relative to the housing and main body and is biased into one position wherein the at least one fixing component maintains the housing and main body in the assembled relationship.

22. The combination according to claim 21 further in combination with a tool that has a fitting that generates a magnetic attraction force between the tool fitting on the at least one fixing component to thereby cause the at least one fixing component to be moved from the one position into another position wherein the at least one fixing component no longer maintains the main body and housing in the assembled relationship.

23. The combination according to claim 17 wherein there is a rib on one of the main body and housing that cooperates with a slot on the other of the main body and housing so as to guide the main body into and out of the receptacle.

* * * * *